United States Patent Office 3,060,125
Patented Oct. 23, 1962

3,060,125
STABLE SOLVENT COMPOSITION
Leslie L. Sims, Baton Rouge, La., assignor to Ethyl Corporation, New York, N.Y., a corporation of Delaware
No Drawing. Filed Nov. 28, 1958, Ser. No. 776,768
5 Claims. (Cl. 252—153)

This invention relates to chlorinated solvents, and particularly to new and highly effective stabilized solvent compositions particularly suitable for the liquid and vapor phase degreasing of metals.

Chlorinated aliphatic hydrocarbons are useful as solvents for the degreasing of metals, for dry cleaning and for many other purposes. Such solvents are particularly useful in the degreasing of metals because of their low flammability and high solvency for oils and greases. Among the most widely used of these solvents are carbon tetrachloride, ethylene dichloride, trichloroethylene and perchloroethylene. Unfortunately, however, chlorinated aliphatic hydrocarbons in general attack and cause corrosion of metallic surfaces upon contact therewith. Such attacks, which also decompose the chlorinated aliphatic hydrocarbon, occur with surprising rapidity, especially at elevated temperatures.

A highly desirable chlorinated hydrocarbon is methyl chloroform, or 1,1,1-trichloroethane, which is known to have exceptionally good solvency powers and other highly desirable properties, particularly for metal cleaning operations. Very unfortunately, however, this particular solvent also exhibits an aggravated tendency to decompose and concurrently attack metals both at ambient or storage conditions, and at elevated temperatures suitable for cleaning operations. The reason for this marked inadequacy of 1,1,1-trichloroethane is not understood. The weakness is thought to be because of the number of chlorine atoms attached to a single carbon atom within the molecular structure of 1,1,1-trichloroethane. But whatever the explanation, the above described deficiency has deterred commercial usage of the solvent. A significant need therefore exists for stabilized chlorinated hydrocarbon compositions, particularly those suitable for the elevated temperature treatment of iron, copper, aluminum and other easily corroded metals.

It is accordingly the object of this invention to provide stabilized compositions which are highly effective for the liquid and vapor phase degreasing of aluminum, iron, copper and other metals. A particular object is to provide chlorinated hydrocarbon solvent systems which retain chemical passivity during repeated cycles of exposure to metals at processing conditions. It is an even more particular object to provide a stabilized 1,1,1-trichloroethane solvent system of the latter type. Other objects will appear hereinafter.

The present invention is a solvent composition comprising a chlorinated hydrocarbon solvent having dissolved therein a minor and stabilizing amount of a mixture of a nitroaliphatic compound, having the general formula $RNO_2$ as hereinafter defined, and an aliphatic carboxylic ester, having the general formula $RCOOR$, wherein R, in either compound, is an aliphatic hydrocarbon radical having not more than 3 carbon atoms, and where the summation of the carbons contained within the aliphatic hydrocarbon radicals of the aliphatic carboxylic ester is not greater than 6. Thus, R represents hydrocarbon radicals selected from a group consisting of alkyl, isoalkyl, alkenyl, isoalkenyl, alkynyl, and isoalkynyl hydrocarbon radicals. Specifically, the nitroaliphatic compound incudes nitromethane, nitroethane, nitroethylene, nitroacetylene, 2-nitropropane, 1-nitropropylene, 2-nitro-1-propene, 1-nitro-2-propyne, etc.; compounds of the aliphatic carboxylic ester type include methyl acetate, ethyl acetate, n-propyl acetate, butyl acetate, amyl acetate, isopropyl acetate, 3-isoamyl acetate, ethynyl acetate, 2-propnyl acetate, 3-penten-1-yl acetate, ethynyl propionate, ethynyl butyrate, 2-propnyl butyrate, methyl butyrate, ethyl butyrate, methyl crotonate, methyl sorbinate, methyl 3-butenate, methyl acrylate, ethyl acrylate, ethyl propiolate, isopropyl propiolate, isopropyl tetrolate, etc.

It has been found that relatively small amounts of a mixture of a nitroaliphatic compound and an aliphatic carboxylic ester added to a chlorinated hydrocarbon solvent forms a highly stable solvent system, one which is highly beneficial for the liquid and vapor degreasing of iron, copper, aluminum and other metals. It has been found that not only are each of the components in themselves beneficial as stabilizers but also that the stabilizer pair produces far greater benefits than can be attributed to the use of either compound alone. This multifold benefit is greatly unexpected. A highly preferred stabilized composition of this type is 1,1,1-trichloroethane containing an inhibiting amount of a stabilizer pair consisting of nitromethane and ethyl acetate. Generally, it is required that the quantity of either component within the stabilizing mixture should be present in at least about 10 percent by weight of the compound which is used in the highest concentration. The sum total weight of the mixture of stabilizers used in any given chlorinated hydrocarbon solvent should be between about 0.3 and 12 weight percent of the solvent composition employed. Good results can be obtained when about 1 to about 4 percent by weight of a mixture of the above said two components are present in the chlorinated hydrocarbon solvent. Preferably, a weight concentration of the sum total or mixture of the stabilizing components is about 2 percent of the weight of the solvent employed. Generally, the individual components can be mixed together in substantially equal volumetric amounts and added to the chlorinated hydrocarbon solvents and excellent results obtained. A satisfactory 1,1,1-trichloroethane composition is formed by adding equal volumetric amounts of nitromethane and ethyl acetate thereto, which corresponds to 0.17 weight percent nitromethane and about 0.14 weight percent ethyl acetate. This particular combination has a stabilizing effect which far surpasses the stabilizing aspects of either of these components used individually.

The particular combinations of stabilizers heretofore stated are very effective with various chlorinated hydrocarbon solvents. Illustrative of these are carbon tetrachloride, ethylene dichloride, trichloroethylene, perchloroethylene, and in particular methyl chloroform or 1,1,1-trichloroethane.

As indicated above, stabilized liquid compositions of the present invention show little or no tendency to attack metals even at boiling conditions. The stabilized liquid can be stored for considerable periods of time, usually for months, in contact with aluminum, iron, copper and various metals, or alloys thereof, without significant decomposition. Also, vapors evolved from many of the stabilized liquid compositions show no tendency to attack metals. This makes many of the present solvent compositions highly effective for vapor phase degreasing operations.

For vapor degreasing applications, it is essential that the 1,1,1-trichloroethane composition be not only stable in the liquid state but also that it be susceptible to vaporizing and condensing with full retention of stability. This can be accomplished if an inhibitor has sufficient volatility to be carried into the vapor space in sufficient quantities to stabilize the latter without unduly depleting the liquid phase. In the instant case the stabilizers named provide excellent vapor phase inhibitors from the standpoint of volatility because the concentration of the additives in the vapor phase is very high in relation to their concentration in the liquid phase over a considerable concentration range, beyond the concentration thereof in a chlorinated hydrocarbon solvent necessary for effective stabilization, as hereinafter expressed.

The following examples demonstrate the effectiveness of stabilized chlorinated hydrocarbon solvents, particularly 1,1,1-trichloroethane solvent in the liquid and vapor phase even at threshold conditions. In each of the demonstrations tared polished strips of aluminum, iron and copper metals were placed in glass flasks. The lower ends of the strips were immersed in the liquid and the upper end exposed only to the vapors. The strips were exposed to the boiling solvent for one and one-half hours and at the end of this time were dried and reweighed. Corrosion is measured by the observed loss of weight of the individual metal strips.

The following example demonstrates the benefits derived from a stabilized 1,1,1-trichloroethane composition, or more specifically, such solvent stabilized with an "inhibiting amount" of a mixture of a nitroaliphatic compound and an aliphatic carboxylic ester.

EXAMPLE I

A series of three runs was performed as shown in the table below. Metallic strips of iron, copper and aluminum were subjected to refluxing conditions for one and one-half hours, at ambient pressure. The weight percentages of the stabilizers present, based on the weight of the 1,1,1-trichloroethane solvent, is shown in the first columns opposite the particular run or demonstration. The weight percent loss, based on the original weight of the particular metallic strip as contrasted with its final weight at the end of the demonstration, is shown for each of the metals in the next series of columns. Run 1 reflects the advantages derived from the use of nitromethane used alone to stabilize 1,1,1-trichloroethane, and Run 2 demonstrates the advantages obtained by the use of ethyl acetate alone. Run 3 demonstrates the results provided by using a mixture of nitromethane and ethyl acetate. Thus, the advantages derived from the use of this mixture to stabilize 1,1,1-trichloroethane against iron metal is roughly 11-fold over the use of nitromethane alone and 16-fold over the use of ethyl acetate alone. For copper, the advantages derived are approximately 25-fold over the use of nitromethane alone and 11-fold over the use of ethyl acetate alone. The results of the use of this mixture with metallic aluminum are phenomenal. Thus, it is seen that the use of the synergistic mixture is in excess of 56-fold over the use of nitromethane alone and approximately 50-fold over the advantages derived from the use of ethyl acetate alone.

*Table*

| Run | Weight Concentration of Components Added | | | Weight Percent Loss of Metal Strip | | |
|---|---|---|---|---|---|---|
| | Nitromethane | Ethyl Acetate | Total Concentration | Iron | Copper | Aluminum |
| 1 | 0.43 | 0.0 | 0.43 | 0.22 | 0.57 | 25.0 |
| 2 | 0.0 | 0.34 | 0.34 | 0.32 | 0.27 | 21.0 |
| 3 | 0.21 | 0.17 | 0.38 | 0.02 | 0.024 | 0.44 |

The following example demonstrates a stabilized solvent composition of the same type as used in the foregoing example except that in this instance a higher concentration of the stabilizing mixture of nitromethane and ethyl acetate is used.

EXAMPLE II

The foregoing example is repeated in all details except that in this instance a 2 weight percent concentration of the mixture of nitromethane and ethyl acetate in 1,1,1-trichloroethane is used and the refluxing is conducted for a period of 12 hours. The stabilizing effect of the system, as evidenced by the time required for the metal strips to show any loss of weight, is far superior to the results obtained by the use of a lower weight composition of the mixture of stabilizers in the 1,1,1-trichloroethane solvent. The greatly superior advantage of the stabilizer pair, over the use of the individual components of the mixture, is again demonstrated as in the foregoing example.

EXAMPLE III

The foregoing example is again repeated except that in this instance a 5 weight percent solution of the mixture of nitromethane and ethyl acetate in 1,1,1-trichloroethane is formed. The same superior results are again obtained over that of stabilized 1,1,1-trichloroethane solvent compositions wherein the stabilizing compounds are used individually.

Having demonstrated the advantages derived from the use of a mixture of a nitroaliphatic and an aliphatic carboxylic ester wherein these compounds are represented by the member nitromethnae and ethyl acetate, the following examples show the use of other members of these classes of compounds in 1,1,1-trichloroethane.

EXAMPLE IV

All of the foregoing examples are again repeated except that in this instance nitroethane and methyl acetate are employed as the stabilizing mixture for 1,1,1-trichloroethane. Again,, as in the foregoing, highly satisfactory results are obtained.

EXAMPLE V

Examples I through III are again repeated except that in this instance nitroacetylene and ethynyl acetate are employed as the stabilizing mixture for 1,1,1-trichloroethane. Again, highly satisfactory results are obtained. The advantages are clearly superior over the use of either of these components individually to stabilize 1,1,1-trichloroethane.

EXAMPLE VI

Examples I through III are again repeated except that in this instance the stabilizing mixture consists of 2-nitropropane and ethynyl butyrate. Again, as in the foregoing examples, highly satisfactory results are obtained. The use of the mixture is better than the components used individually to stabilize 1,1,1-trichloroethane.

EXAMPLE VII

Examples I through III are again repeated except that in this instance the stabilizing mixture consists of 2-nitro-1-propene and ethyl butyrate. Again, as in the foregoing examples, highly beneficial results are obtained by the use of the mixture as contrasted with the use of either component used individually.

EXAMPLE VIII

Examples I through III are again repeated except that in this instance 1-nitro-2-propyne and methyl crotonate are employed as the stabilizing mixture. Again, highly beneficial results are obtained by the use of this mixture, as contrasted with the use of the components singularly.

EXAMPLE IX

Examples I through III are again repeated except that in this instance a mixture of nitromethane and methyl 3-butyrate are employed to stabilize the 1,1,1-trichloroethane solvent. Again, as in the foregoing examples, highly desirable compositions result. The benefits derived from the use of the mixture are superior to those of either of the components used individually.

EXAMPLE X

Examples I through III are again repeated except that in this instance nitromethane is used with methyl acrylate to stabilize the 1,1,1-trichloroethane solvent. Again, as in the foregoing examples, the use of this mixture produces highly desirable results, and the properties of the mixture are superior to those of either of the components used individually.

EXAMPLE XI

Examples I through III are again repeated except that in this instance nitromethane is used with ethyl propiolate to stabilize the 1,1,1-trichloroethane. As in the foregoing examples, a satisfactory system results and the properties of the 1,1,1-trichloroethane solvent to which has been added the stabilizing mixture are superior to the properties of either of these components used individually.

EXAMPLE XII

Examples IV through VIII are again repeated except that in this instance the nitroaliphatic compound is replaced with ethyl acetate. Again, as in the foregoing examples, highly satisfactory results are obtained and the use of the stabilizing mixture is superior to the use of either of the components used individually.

EXAMPLE XIII

Examples IV through VIII are again repeated except that in this instance the nitroaliphatic compound is replaced with nitromethane. Again, as in the foregoing examples, highly satisfactory results are obtained and the properties resulting from the use of the stabilizing mixture are superior to those of the components used individually.

EXAMPLE XIV

All of the foregoing examples are again repeated except that in this instance the chlorinated hydrocarbon solvent stabilized is 1,1,2-trichloroethylene. A highly desirable stabilized solvent composition results, and one which is superior to that which results from the use of either of the components of the mixture used alone to stabilize the 1,1,2-trichloroethylene solvent.

EXAMPLE XV

The foregoing examples are again repeated except that in this instance the chlorinated hydrocarbon solvent which is stabilized is carbontetrachloride, ethylenedichloride and perchloroethylene, respectively. Again, highly stable compositions result, these being superior to the stabilized compositions which result from the use of either of the components used individually to stabilize the solvent.

It will be understood that certain minor modifications can be made in the above process without departing from the spirit and scope of the invention. For example, it will be understood that "metal" as used in the foregoing specification includes at least aluminum, iron and copper. It is also used generically to include the various alloys as well as the elemental metal. By "inhibiting amount" of the compounds is meant any amount thereof added to stabilize the various chlorinated hydrocarbon solvents against decomposition. A certain minimum concentration of the mixed stabilizers must be added to effectively stabilize the chlorinated hydrocarbon solvents, i.e. on the order of about a 0.3 percent weight concentration of the mixture based on the weight of the said stabilized solvent, though this can vary slightly with temperature and with the number and quantity of other materials present which tend to accelerate the reaction. The upper concentration limit of the mixed stabilizers in the chlorinated hydrocarbon solvents is much less critical, any concentration greater than the minimum concentration producing a stabilized solvent. Greater concentrations can be used quite successfully.

Having described the invention what is claimed is:

1. A stabilized composition for metal degreasing comprising 1,1,1-trichloroethane having from about 0.3 to about 12 weight percent of a stabilizing mixture dissolved therein to stabilize the 1,1,1-trichloroethane against decomposition, said stabilizing mixture consisting essentially of a nitroaliphatic hydrocarbon compound having not more than three carbon atoms, and an aliphatic carboxylic ester having not more than three carbon atoms within each aliphatic hydrocarbon radical, either component of said mixture being present in at least about 10 percent by weight of the other component.

2. The degreasing composition of claim 1 wherein the nitroaliphatic compound is nitromethane.

3. The degreasing composition of claim 1 wherein the aliphatic carboxylic ester is ethyl acetate.

4. A stabilized composition for metal degreasing comprising 1,1,1-trichloroethane having from about 0.3 to about 12 weight percent of a stabilizing mixture dissolved therein sufficient to stabilize the 1,1,1-trichloroethane against decomposition, said stabilizing mixture consisting essentially of nitromethane and ethyl acetate, either component of said mixture being present in at least about 10 percent by weight of the other component.

5. A stable solvent composition consisting essentially of 1,1,1-trichloroethane having from about 1 to about 4 weight percent of a stabilizing mixture of nitromethane and ethyl acetate dissolved therein, sufficient to stabilize the 1,1,1-trichloroethane against decomposition, either component of said mixture being present in at least about 10 percent by weight of the other component.

References Cited in the file of this patent

UNITED STATES PATENTS

| | | |
|---|---|---|
| 2,371,647 | Petering et al. | Mar. 20, 1945 |
| 2,567,621 | Skeeters et al. | Sept. 11, 1951 |
| 2,887,516 | Ferri et al. | May 19, 1959 |

FOREIGN PATENTS

| | | |
|---|---|---|
| 765,522 | Great Britain | Jan. 9, 1957 |